(12) United States Patent
Gerard et al.

(10) Patent No.: US 9,649,951 B2
(45) Date of Patent: May 16, 2017

(54) MOTOR VEHICLE DRIVE UNIT INCLUDING A FUEL CELL AND AN ENERGY STORAGE SYSTEM

(71) Applicants: Commissariat à l'énergie atomique et aux énergies alternatives, Paris (FR);

(Continued)

(72) Inventors: Mathias Gerard, Grenoble (FR); Eric Bideaux, Tevoux (FR);

(Continued)

(73) Assignees: Commissariat à l'énergie atomique et aux énergies alternatives, Paris (FR); Institut National des Sciences Appliquées de Lyon, Villeurbanne (FR); Centre National de la Recherche Scientifique, Paris (FR); Université Lyon 1 Claude Bernard, Villeurbanne (FR); Ecole Centrale De Lyon, Ecully (FR); Institut Français des Sciences et Technologies des Transports Réseaux, Champs sur Marne (FR)

( * ) Notice: Subject to any disclaimer, the term of this patent is extended or adjusted under 35 U.S.C. 154(b) by 255 days.

(21) Appl. No.: 14/414,603

(22) PCT Filed: Jul. 11, 2013

(86) PCT No.: PCT/EP2013/064746
§ 371 (c)(1),
(2) Date: Jan. 13, 2015

(87) PCT Pub. No.: WO2014/009505
PCT Pub. Date: Jan. 6, 2014

(65) Prior Publication Data
US 2015/0202987 A1 Jul. 23, 2015

(30) Foreign Application Priority Data

Jul. 13, 2012 (FR) .................................. 12 56811

(51) Int. Cl.
| | | |
|---|---|---|
| *B60L 11/18* | (2006.01) | |
| *H01M 8/04992* | (2016.01) | |
| *H01M 16/00* | (2006.01) | |

(52) U.S. Cl.
CPC ..... *B60L 11/1887* (2013.01); *H01M 8/04992* (2013.01); *H01M 16/006* (2013.01);
(Continued)

(58) Field of Classification Search
None
See application file for complete search history.

(56) References Cited

U.S. PATENT DOCUMENTS 7,767,328 B2 * 8/2010 Kobayashi ........ H01M 8/04223
429/432
7,842,428 B2 * 11/2010 Scharf ............... H01M 8/04089
429/428

(Continued)

FOREIGN PATENT DOCUMENTS

| JP | 2008-146923 | 6/2008 |
|---|---|---|
| JP | 2009-104833 | 5/2009 |

(Continued)

OTHER PUBLICATIONS

Gao et al., "Dynamic Lithium-Ion battery model for system simulation," IEEE Transactions on Components and Packaging Technologies 25:3 pp. 495-505 (2002).
(Continued)

*Primary Examiner* — Jerrah Edwards
*Assistant Examiner* — Donald J Wallace
(74) *Attorney, Agent, or Firm* — Occhiuti & Rohlicek LLP (57) ABSTRACT

An automotive vehicle drive unit, comprising a fuel cell whose control input is a setpoint of the electrical power to (Continued)

be delivered by the fuel cell. There is a reversible electrical energy storage system and an electric motor to propel the wheels of a vehicle. An electrical connection element selectively connects the fuel cell and/or the energy storage system to the electric motor. A control circuit stores a model of the consumption of dihydrogen as a function of the power delivered by this fuel cell, in the form of a second-degree polynomial and is configured to compute a coefficient of power distribution $\lambda 1$ between the fuel cell and the electrical energy storage system pursuant to a defined equation. The control circuit controls the electrical connection element to recharge the energy storage system when the value of the power setpoint $Pfc^*$ is greater than the power demanded by the electric motor.

9 Claims, 3 Drawing Sheets

(71) Applicants: Institut National des Sciences Appliquées de Lyon, Villeurbanne (FR); Centre National de la Recherche Scientifique, Paris (FR); Université Lyon 1 Claude Bernard, Villeurbanne (FR); Ecole Centrale De Lyon, Ecully (FR); Institut Français des Sciences et Technologies des Transports Réseaux, Champs sur Marne (FR)

(72) Inventors: Ramon Da Fonseca, Villeurbanne (FR); Matthieu Desbois-Renaudin, Villard de Lans (FR); Bruno Jeanneret, Lyons (FR)

(52) U.S. Cl.
CPC .......... *H01M 2250/20* (2013.01); *Y02T 90/32* (2013.01); *Y02T 90/34* (2013.01); *Y10S 903/944* (2013.01)

(56) References Cited

U.S. PATENT DOCUMENTS

| | | | | |
|---|---|---|---|---|
| 8,277,990 B2* | 10/2012 | Umayahara | ......... | B60L 11/1887 429/428 |
| 9,034,495 B2* | 5/2015 | Umayahara | ....... | H01M 8/04619 429/432 |
| 2002/0162694 A1* | 11/2002 | Iwasaki | ................... | H01M 8/04 429/430 |
| 2010/0239935 A1 | 9/2010 | Katano | | |
| 2010/0316921 A1 | 12/2010 | Yoshida et al. | | |
| 2011/0172865 A1* | 7/2011 | Liang | ..................... | B60K 6/445 701/22 |
| 2013/0211798 A1* | 8/2013 | Maier | ............... | H01M 8/04992 703/2 |
| 2014/0080022 A1* | 3/2014 | Kim | .................. | H01M 8/04365 429/431 |
| 2014/0244064 A1* | 8/2014 | Okino | ............... | H01M 8/04955 700/297 |

FOREIGN PATENT DOCUMENTS

| | | |
|---|---|---|
| JP | 2010-257731 | 11/2010 |
| WO | 2006120822 | 11/2006 |

OTHER PUBLICATIONS

Gerard et al., "Oxygen starvation analysis during air feeding faults in PEMFC," International Journal of Hydrogen Energy 35 pp. 12295-12307 (2010).
Koot et al., "Energy management strategies for vehicular electric power systems," IEEE Transactions on Vehicular Technology 54:3 pp. 771-(2005).
Koot et al., "Energy management strategies for vehicular electric power systems," Doctoral Thesis (2006).
Mensing et al., "Vehicle trajectory optimization for application in eco-driving," 2011 IEEE Vehicle Power and Propulsion Conference (2011).
Poirot-Crouvezier, "Modelisation Dynamique Des Phenomenes Hydrauliques, Thermiques Et Electriques Dans Un Groupe Electrogene A Pile A Combustible Destine A L'application Automobile," Doctoral Thesis (2000).
Vinot et al., "Optimal management of electric vehicles with a hybrid storage system, " 2010 IEEE Vehicle Power and Propulsion Conference (2010).
Ceraolo et al., "High power Lithium batteries usage in hybrid vehicles," 2010 IEEE Vehicle Power and Propulsion Conference (2010).
Delprat et al., "Control of a Parallel Hybrid Powertrain: Optimal Control," IEEE Transactions on Vehicular Technology 53:3 pp. 872-881 (2004).
Fernandez et al., "Hybrid electric system based on fuel cell and battery and integrating a single dc/dc converter for a tramway," Energy Conversion and Management 52 pp. 2183-2192 (2011).
Fliess et al., "Flatness and Defect of Nonlinear Systems: Introductory Theory and Examples," International Journal of Control 61:6 pp. 1327-1361 (1995).
Kermani, "Mention Automatique Spécialité Automatique et Génie informatique," Doctoral Thesis.
Kessels, "Energy Management for Automotive Power Nets," Doctoral Thesis (2007).
Moore and Lovins, "Vehicle Design Strategies to Meet and Exceed PNGV Goals," SAE Technical Paper 951906 (1995).
Mouhib et al., "Optimal control problem in bond graph formalism," Simulation Modelling Practice and Theory 17 pp. 240-256 (2009).
Pierfederici et al., "Differential Flatness-Based Control for Fuel Cell Hybrid Power Source," Proceedings of the 1st International Conference on Technical Education pp. 123-132 (2010).
Poirot-Crouvizier, "Modelisation Dynamique Des Phenomenes Hydrauliques, Thermiques Et Electriques Dans Un Groupe Electrogene A Pile A Combustible Destine A L'application Automobile," Doctoral Thesis (2000).
Pukrushpan, "Modeling and Control of Fuel Cell Systems and Fuel Processors," Doctoral Dissertation (2003).
Pukrushpan, "Control-oriented model of fuel processor for hydrogen generation in fuel cell applications," Control Engineering Practice 14 pp. 277-293 (2006).
Scordia, "Approche Systématique de l'optimisation du dimensionnement et de l'élaboration de lois de gestion d'énergie de véhicules hybrides," Doctoral Thesis (2004).
Thounthong et al., "Fuel Cell Power Regulation Based-on Differential Flatness Theory for High-Power Converter Applications," XIX International Conference on Electrical Machines (2010).
Tritschler et al., "Energy Management strategies for an embedded fuel cell system on agricultural vehicles," 2010 XIX International Conference on Electrical Machines (ICEM) pp. 1-6 (2010).
Wu et al., "Component sizing optimization of plug-in hybrid electric vehicles," Applied Energy 88:3 pp. 799-804 (2011).

* cited by examiner

MOTOR VEHICLE DRIVE UNIT INCLUDING A FUEL CELL AND AN ENERGY STORAGE SYSTEM

RELATED APPLICATIONS

This application is a U.S. National Stage of international application number PCT/EP2013/064746 filed Jul. 11, 2013, which claims the benefit of the priority date of French Patent Application FR 1256811, filed Jul. 13, 2012, the contents of which are herein incorporated by reference.

FIELD OF INVENTION

The invention relates to the drive units of hybrid vehicles, and in particular the control of hybrid drive units including an electric motor supplied either by an accumulator battery or by a fuel cell.

BACKGROUND

The growing requirement to reduce noxious gas emissions for transport applications is leading to significant research studies. The development of vehicles that are more efficient in terms of energy consumption forms part of the main objectives. The hybrid drive unit solutions which include an electric motor are witnessing significant development. Hybridization offers the following advantages in particular:

- energy recovery during braking. Part of the inertial mechanical power of the vehicle is recovered by the electric motor operating as a generator and stored in the battery;
- having an additional degree of freedom in the management of the vehicle's energy consumption. The operating points of the various sources of the vehicle can thus be used with their optimal efficiencies during use.

In particular, in an electric vehicle with fuel cell (FC) based on hydrogen, hybridization with an electrical energy storage system (ESS) such as an electrochemical accumulator battery, opens the possibility of limiting the dynamics of the fuel cell. The ESS provides the high dynamic power required by the vehicle whereas the FC system can provide the power suited to its own more restricted dynamics (close to the average power of the vehicle). Whereas the electrochemical accumulator battery is a reversible energy conversion system, the FC is a non-reversible energy conversion system.

A control of the distribution of the power provision between the FC and the ESS is necessary in order to optimize the energy consumption. A system for managing the power distribution is generally designated by the term EMS.

An EMS can either implement an off-line optimization (control laws simulated beforehand) or an on-line optimization (adaptation of the control laws to the operating conditions encountered by the vehicle).

The document drafted by M M Vinot, Trigui and Jeanneret and entitled 'optimal management of electric vehicles with hybrid system', published within the framework of the IEEE conference 'Vehicle power and propulsion conference' held in Lille in June 2010, describes a method of control of the EMS within the framework of a vehicle combining batteries and super-capacitors for the power supply of the electric motor. The procedure proposed in this document makes it possible to minimize the global energy consumption through its optimization computation. However, the minimization of the energy consumption is truly effective only if the running cycle of the vehicle is known a priori. Such a procedure therefore presents a relatively restricted practical benefit in real applications where the running cycle is often not defined in advance.

The document drafted by M M Thritschler, Bacha, Rullière and Husson and entitled 'Energy management strategies for an embedded fuel cell system on agricultural vehicles', published within the framework of the $19^{th}$ ICEM conference held in Rome in June 2010, describes the practical use of the Pontryagin maximum principle adapted for on-line application in a heavy vehicle with fuel cell. This procedure for real-time control of the EMS does not require a priori knowledge of the vehicle driving cycle. The state of charge of the electrical energy storage system is maintained by using the recharging by the FC (conversion of hydrogen). The energy optimization is based on the minimization of the fuel consumption, subject to constraints such as the maintaining of the level of the state of charge in the ESS.

On account of an application to heavy agricultural vehicles in which energy recovery on braking turns out to be almost nonexistent, this procedure does not manage the recuperative braking. Consequently, the efficiency of the system is non-optimal for a conventional automobile application, which alternates frequent cycles of braking and acceleration. Moreover, this procedure is relatively poorly optimized for managing the difference in dynamics of the fuel cell and batteries of accumulators.

SUMMARY

The invention is aimed at solving one or more of these drawbacks, by requiring if possible a restricted computation power for carrying out an on-line optimization, and by carrying out a satisfactory optimization even for non-predefined driving cycles. The invention thus pertains to an automotive vehicle drive unit, comprising:

- a fuel cell comprising a flat non-linear control whose control input Pfc* is a setpoint of the electrical power to be delivered by the fuel cell;
- a reversible electrical energy storage system;
- an electric motor configured to propel the wheels of a vehicle;
- an electrical connection element configured to selectively connect the fuel cell and/or the energy storage system to the electric motor;
- a control circuit:
  storing a model of the consumption of dihydrogen of the fuel cell as a function of the electrical power delivered by this fuel cell, in the form of a second-degree polynomial g(Pfc*)=a*Pfc*$^2$+b*Pfc*+c, with a, b and c being constants;
  configured to compute a coefficient of power distribution λ1 between the fuel cell and the electrical energy storage system $$\lambda_1 = \frac{2a\left(\dfrac{\Delta SoE \cdot \varepsilon_{max}}{\Delta t} - \displaystyle\sum_{j=t}^{t+T_h} P_{bus}(j)\right)}{\left(\dfrac{T_h}{\Delta t}\right)} + b$$

with ΔSoE the difference between a target quantity of energy in the storage system and the current quantity of energy of the storage system expressed as a percentage, $\varepsilon_{max}$ is the maximum quantity of energy that can be stored in the electrical energy storage system, Pbus(j) are measurement values of electrical power exchanged between the electric motor and the electrical connection element, Δt is a time interval separating two successive measurements of Pbus(j), Th is the electric motor's duration of operation taken into account for the computation of λ1;

configured to apply the power setpoint Pfc* to the flat non-linear control of the fuel cell, with Pfc*=(λ1−b)/(2a);

configured to control the electrical connection element so as to recharge the electrical energy storage system when the value of the power setpoint Pfc* is greater than the power demanded by the electric motor.

According to a variant, the control circuit is configured to determine an amplitude of variation between values Pbus and configured to lower the value of Th upon an increase in the amplitude of variation and configured to increase the value of Th upon a decrease in the amplitude of variation.

According to another variant, said duration Th lies between 20 and 600 seconds.

According to another variant, said interval Δt lies between 1 second and 20 seconds.

According to yet another variant, the ratio Th/Δt is at least equal to 5.

According to a variant, the control circuit is configured to compute the value ΔSoE with a lower frequency than the frequency of the power measurements Pbus.

According to another variant, the target quantity of energy lies between 40 and 80% of the maximum quantity of energy of the electrical energy storage system.

According to another variant, the electrical energy storage system includes an electrochemical accumulator battery.

According to yet another variant, the fuel cell comprises:
a reactor;
a pump, said pump being configured to compress air at the cathode of the reactor, said pump including an electric motor and a compression rotor rotated by the electric motor of the pump;
a valve for regulating the air flowrate through the reactor;
the flat nonlinear control of the fuel cell being configured to convert the power setpoint Pfc* respectively into a setpoint voltage of the electric motor of the pump and into a setpoint voltage of the valve.

Other characteristics and advantages of the invention will emerge clearly from the description which is given thereof hereinafter, by way of wholly nonlimiting indication, with reference to the appended drawings.

DETAILED DESCRIPTION

The optimization of the consumption according to the invention is based on an exact optimization theory which makes it possible to ensure stable behavior of the algorithm by taking account of various dynamics of the system. The proposed solution is not confronted with a limitation of implementation, since it makes do with relatively restricted computation and memory resources. This solution therefore adapts well to an embedded on-line application.

The invention furthermore makes it possible to integrate the system operating constraints into the optimization computation, without excessively degrading the energy efficiency of the system.

Figure 1:
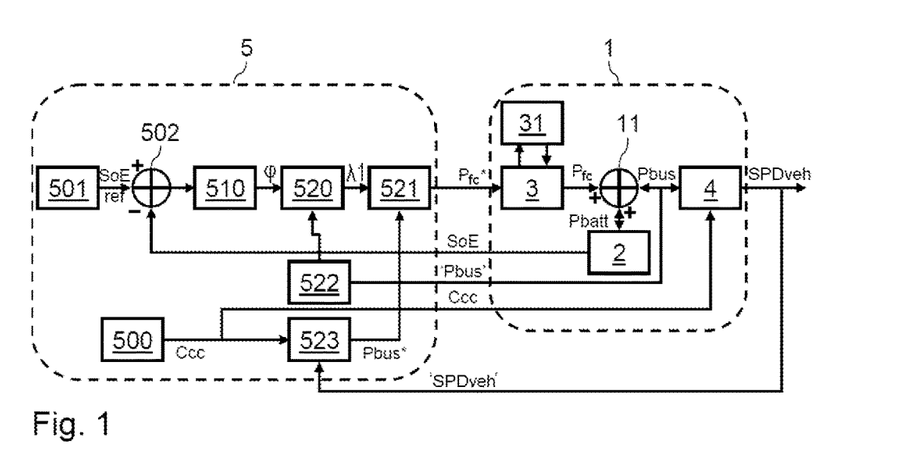
FIG. 1 is a schematic representation of a physical part and of a logical part of a vehicle implementing the invention.

An exemplary hybrid vehicle intended to implement the invention is illustrated schematically in FIG. 1. The vehicle comprises on the one hand a physical part 1 and on the other hand a logical part 5.

The physical part 1 comprises an electrical load 4 of the vehicle and its energy elements (an FC 3 and an electrical energy storage system 2, for example an electrochemical accumulator battery). The electrical load 4 is illustrated schematically and typically includes an electric motor for propelling the wheels of the vehicle, and optionally electrical peripherals (air-conditioning, heating etc.). Subsequently, the electrical load 4 will be regarded as the electrical traction chain of the vehicle, including the electric motor, electrical peripherals, a speed reducer and the wheels of the vehicle.

Let Pbus be the electrical power traveling through the power connection of the electrical load 4, Pfc the electrical power provided by the FC 3 and Pbatt the electrical power provided or received by the storage system 2. Pbus then satisfies the following relation:

$$P\text{bus}=P\text{fc}+P\text{batt}$$

When the electric motor of the load 4 is in motor mode, Pbus corresponds to the electrical power provided to this motor. When the electric motor of the load 4 is in generating mode (during regenerative braking), Pbus corresponds to the electrical power provided to the battery 2 by the motor.

As mentioned earlier, the electrical energy storage system of this example is a battery 2 of electrochemical accumulators. The battery 2 is used:
as supplement or replacement for the electrical power supply of the load 4 during certain operating phases;
as device for storing the energy provided by the load 4 during energy recovery on braking or during the generation of excess electrical power by the fuel cell 3.

The battery 2 thus forms a reversible electrical energy storage system.

The power connection of the electrical load 4 is typically carried out in the form of a DC power bus. An electrical connection 11 makes it possible to couple the power of the FC 3 and the power of the battery 2 so as to supply the electrical load 4. The electrical connection 11 can furthermore couple the battery 2 to the motor of the electrical load 4 in generating mode, so as to recharge this battery 2. The electrical connection 11 can moreover couple the FC 3 to the battery 2 so as to recharge the latter. The electrical connection 11 can include in a manner known per se converters to lower/raise the respective voltages provided by the FC 3 or the electrical energy storage system 2.

The battery 2 comprises a controller (not illustrated) generally designated by the term BMS (for Battery Management System). The BMS is advantageously able to provide a state of charge (generally designated by the term SOC) or a state of energy (generally designated by the term SOE) of the battery 2. The SOC is generally expressed in the form of charge percentage with respect to the maximum charge capacity of the battery 2. The SOE is generally expressed in the form of energy percentage with respect to the maximum energy capacity of the battery 2. Numerous different procedures for computing the SOE or the SOC are known per se to the person skilled in the art. Such computations may in particular use parameters such as the electrical power delivered or absorbed and/or the operating temperature. Hereinafter, the exemplary implementation of the invention will be based on a state of energy. The following relation gives a simple example of determining the state of energy SOE:

SOE (%)=100*(ε/εmax)

With εmax the maximum quantity of energy that can be stored in the battery 2 and with:

$$\varepsilon = -\int_0^T Pbatt \cdot dt$$

The fuel cell or FC 3 comprises a controller 31 dedicated to its operation, as will be detailed subsequently. The operation of the FC 3 makes it possible to convert the chemical energy contained in the form of dihydrogen into electrical energy by an oxydo-reduction electrochemical reaction. The products resulting from the reaction are electrical energy, heat and water. The FC 3 can be implemented in the form of a system such as illustrated schematically in FIG. 2. Such a system makes it possible to distribute and to condition the reactive gases (dihydrogen and dioxygen), to cool the cell, and to recover the electrical energy produced.

Figure 2:
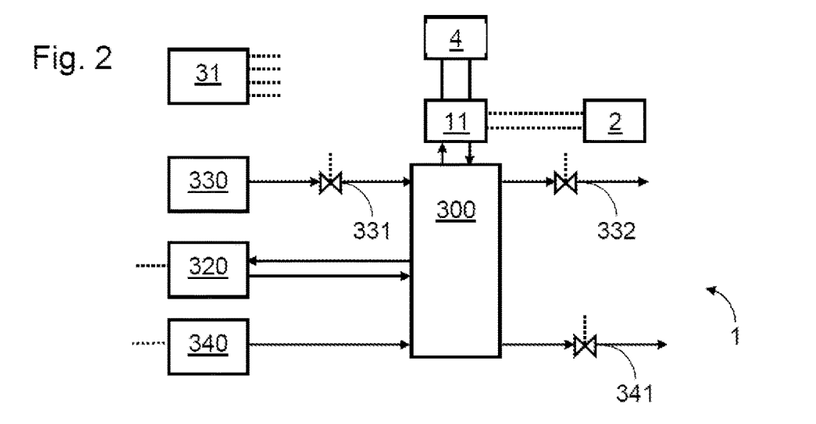
FIG. 2 is a schematic representation of a fuel cell coupled to other components of the vehicle.

The FC 3 generally comprises a set of cells connected electrically in series and forming a reactor 300. The voltage across the terminals of each cell of the FC 3 is dependent on various variables, such as the pressure at the cathode, the pressure at the anode, the stoichiometry of oxygen, the relative humidity, the temperature of the cell and the electric current drawn by the FC 3.

The FC 3 comprises a reservoir for dihydrogen 330. Valves 331 and 332 control the quantity of dihydrogen flowing to the reactor 300 and from the reactor to ambient. A cooling circuit 320 manages the flow of a heat-carrying fluid in the reactor 300, so as to maintain an optimal operating temperature in the latter. The FC 3 furthermore comprises a compressor 340. A valve 341 controls the pressure established in the chamber of the cathode of the FC at the reactor 300.

The controller 31 moreover controls various components of the FC 3. The controller 31 controls in particular the valves 331 and 332 so as to define the quantity of dihydrogen flowing to the reactor 300 and from the reactor 300. The controller 31 furthermore controls the valve 341 to define the quantity of air flowing from the reactor 300 for the control of the pressure in the cathodic chamber of the reactor 300. The controller 31 controls the compressor 340 so as to define the quantity of air flowing to the reactor 300. The controller 31 controls the cooling circuit 320, in order to regulate the operating temperature of the reactor. The controller 31 is configured to define operating parameters of the FC 3 so as to optimize its performance for a desired operating point. The controller 31 thus comprises respective control laws for the valves 331, 332, 341, the compressor 340 and the cooling circuit 320.

The logical part 5 is typically implemented in the form of a computer, executing for example one or more embedded programs for optimizing the operation of the physical part 1.

The logical part 5 comprises a control interface 500, for example an accelerator pedal. By way of the control interface 500, the driver applies a torque setpoint Ccc. This torque setpoint Ccc is applied to the motor of the electrical load 4. The output variable of the vehicle is the speed of the vehicle SPDveh.

The logical part 5 comprises an optimization function 521. The optimization function is intended to generate a power setpoint Pfc* destined for the FC 3. The power Pbat is adapted as a function of the torque setpoint Ccc and of the setpoint Pfc*. This power setpoint Pfc* corresponds to the optimal value of power that the FC 3 must provide on the electrical connection 11. The optimization function 521 is intended not only to find the power setpoint Pfc* which minimizes the global consumption of hydrogen for a running cycle, but also intended to take into account limitations and restrictions of the system, such as the respective operating points in terms of power of the FC 3 and of the battery 2, the response dynamics of the various components and the limits of the state variables of the physical part 1.

The logical part 5 furthermore comprises:
  a function 501 for defining a reference value SoEref of the energy level of the electrical energy storage system 2;
  a comparator 502;
  a robustness function 510;
  a forecast function 522;
  a forecast correction function 520;
  an estimation function 523.

The interface 500 provides the setpoint value Ccc to the estimation function 523. The function 523 receives the vehicle speed value 'SPDveh'. The function 523 provides the value Pbus* to the optimization function 521.

The comparator 502 provides to the robustness function 510, ΔSoE, i.e. the difference between the value SoEref (provided by the function 501) and the measured value of state of energy SoE (provided by the electrical energy storage system).

The robustness function 510 provides a parameter φ to the function 520.

The forecast function 522 receives the power value 'Pbus', representative of the electrical power Pbus. The forecast function 522 provides the power distribution Pbus forecasted, based on data acquired in the past, to the correction function 520.

The correction function 520 provides a parameter λ1 to the optimization function 521.

The dynamics of the FC 3 depends mainly on the dynamics of its air circuit. The command setpoints generated by the logical part 5 for the FC 3 are aimed at synthesizing the control of the air circuit of the FC 3. A flat nonlinear control is used in the controller 31, according to the principle set forth hereinbelow.

The air circuit generally includes, in a sequential manner, from the input to the output: an air filter, the compressor 340, an evaporator-condenser, the cathode volume, an air/liquid water separator, and the valve 341 which controls the pressure at the cathode of the reactor. The compressor 340 is generally a rotary compressor.

In the modeling of the air circuit, an approximation is carried out by taking into account the components having the predominant dynamics: the air compressor, the air volume between the output of the compressor and the output of the cathode, and the valve 341. It is taken as simplifying assumption that the pressure between the output of the compressor 340 and the output of the cathode is homogeneous.

The two most important variables for the operation of the FC 3 are the cathodic pressure (partial pressure of oxygen) and the air flowrate (oxygen flux). These variables are controlled dynamically by the valve 341 and by the compressor 340. Concerning the rotary motor of the compressor, the mechanical part possesses the slowest dynamics of the compressor 340. The dynamics of the electrical part is neglected for the sake of simplification. A linear relation between the electrical part and the mechanical part of the air circuit is provided by the following relation:

$$\frac{d\omega}{dt} = \frac{1}{J_{mot}}(\alpha * u_{mot} - C_r - \Phi \cdot \omega) \quad [1]$$

Where $\omega$ is the rotation speed of the motor of the compressor, $\alpha$ is the compressor voltage/current transformation coefficient, umot is the voltage applied to the motor, Jmot is the inertia of the motor, Cr is the resistive torque imposed by the compression phase and $\phi$ is the coefficient of friction of the rotor of the motor.

The compression step may be represented by the following system of static equations:

$$\begin{cases} \Pi = \dfrac{p_{cath}}{p_{atm}} \\ q_{air} = \omega \dfrac{p_{cath}}{RTemp_{atm}} \dfrac{cyl}{2\pi} \eta_v(\Pi, \omega) \\ C_r = \dfrac{p_{cath}}{R} \dfrac{cyl}{2\pi} C_{Pair} \dfrac{cyl}{\eta_{is}} \eta_v(\Pi, \omega)\left(\Pi^{\frac{\gamma-1}{\gamma}} - 1\right) \end{cases} \quad [2]$$

Where $q_{air}$ is the output air flowrate, Pcath is the pressure imposed by the cathode, Patm is the atmospheric pressure, Tempatm is the temperature of the input air (atmospheric temperature), cyl is the capacity of the compressor, R is the gas constant, $\eta$is is the isentropic efficiency, $\eta$v is the volumetric efficiency, $\gamma$ is the ratio of the specific heat and Cpair is the specific heat of the air. The isentropic efficiency and the volumetric efficiency are parameters dependent on the compression rate and on the rotation speed of the electric motor of the compressor 340.

The last element in the circuit is the volumetric capacity of the cathode. Its pressure state can be represented by the differential equation for ideal gases according to the following relation:

$$\frac{dp_{cath}}{dt} = \frac{(q_{air} + q_{H_2O} - q_{O_2} - q_{valve})RTemp_{cath}}{V} \quad [3]$$

With the following system of equations:

$$\begin{cases} q_{H_2O} = \dfrac{N_{cell}I_{fc}}{2F}; q_{O_2} = \dfrac{N_{cell}I_{fc}}{4F} \\ q_{valve} = \dfrac{C_d C_m u_{valve} p_{cath}}{\sqrt{Temp_{cath}}} \\ C_m = \sqrt{\left[\dfrac{2\gamma}{R(\gamma-1)}\right]\left\{\left(\dfrac{p_{atm}}{p_{cath}}\right)^{\frac{2}{\gamma}}\left(\dfrac{p_{atm}}{p_{cath}}\right)^{\frac{(\gamma+1)}{\gamma}}\right\}} \end{cases} \quad [4]$$

Where V is the volume of the cathode, qair is the air flowrate of the compressor, qH2O is the flowrate of water produced by the electrochemical reaction of the reactor 300, qO2 is the flowrate of oxygen consumed by the reactor 300, qvalve is the output air flowrate from the cathode, Tempcath is the temperature of the gases at the cathode, Ncell is the number of electrochemical cells of the reactor 300, F is the Faraday constant, Ifc is the current generated by the FC 3, uvalve is the input variable for controlling the flowrate exiting the valve, and Cd is a discharge coefficient. The temperature Tempcath is considered constant for simplicity.

The air circuit model in the following equation system [5] is defined by relations [1] and [3] using equation systems [2] and [4].

$$\begin{cases} \dfrac{d\omega}{dt} = \dfrac{k}{J_{mot}} \cdot u_{mot} - \dfrac{p_{cath}}{J_{mot}R} \dfrac{cyl^2 \eta_v C_{Pair}}{2\pi \eta_{is}}\left(\left(\dfrac{p_{cath}}{p_{atm}}\right)^{\frac{\gamma-1}{\gamma}} - 1\right) - \dfrac{\Phi}{J_{mot}}\omega \\ \dfrac{dp_{cath}}{dt} = \dfrac{RTemp_{cath}}{V}\left(\omega \dfrac{p_{cath}}{RT_{atm}} \dfrac{cyl}{2\pi}\eta_v + q_{H_2O} - q_{O_2} - \dfrac{C_d C_m u_{valve} p_{cath}}{\sqrt{Temp_{cath}}}\right) \end{cases} \quad [5]$$

The model of the air circuit is thus defined by two nonlinear equations giving the relation between the two state variables $\omega$ and Pcath and two inputs umot and uvalve. The behavior of these two state variables is predominant so as to ensure proper operation of the FC 3. In practice, the values of the cathodic pressure Pcath and of the oxygen stoichiometry StO2 (defined by the ratio of the oxygen flowrate delivered to the oxygen flowrate required) remain relatively constant despite the variations in demand for current on the FC 3.

The synthesis of a, so-called flat, nonlinear control law for the air circuit will now be described. To respond to the nonlinear dynamics of the air circuit (system of equations [5]), a nonlinear control law based on linearization by the application of a theory of flatness is applied (this theory is in particular described in the publication by M M Fliess, Lévine, Martin and Rouchon, 'Flatness and defect of non-linear systems: Introductory theory and examples', International Journal of Control, vol. 61, p. 1327:1361, 1995). In order to facilitate the design of the control law, the following assumptions are used: the efficiencies of the compressor, the conditions of the ambient air and the temperature of the cathode are constant.

This approach requires that the two control outputs y1 and y2 be chosen such that the states and the inputs of the systems are expressed as a function of the outputs y1 and y2 and of their successive derivatives. The sum of the highest degree of differentiation of each output must have the same value as the characteristic index of the system $\rho$. For each output yi, there exists a characteristic index $\rho$i, the sum of all the $\rho$i giving the value of the characteristic index of the system.

The two important variables to be controlled are pcath and $q_{air}$. The first is a state variable while the second depends on the two state variables. Therefore by choosing the state variables as outputs (y1=$\omega$ and y2=pcath), the following system of equations [6] represents the new system (the parameters k1 to k6 are constants used to simplify the presentation):

$$\begin{cases} \dot{y}_1 = k_1 \cdot u_{mot} - k_2 y_2\left(\left(\dfrac{y_2}{10^5}\right)^{\frac{\gamma-1}{\gamma}} - 1\right) - k_3 y_1 \\ \dot{y}_2 = k_4 k_5 y_1 y_2 + k_4 q_{H_2O} - k_4 q_{O_2} - k_4 k_6 u_{valve} y_2 \end{cases} \quad [6]$$

In this system, the states and the inputs depend only on the outputs y1 and y2 and on their derivatives, thus signifying that the system does not possess any residual dynamics (complete linearization) and that all the states are observable and controllable. The controls of the variables umot and uvalve are presented in relations [7] and [8].

$$u_{mot} = \frac{\dot{y}_1^d + k_3 y_1^d + k_2 y_2^d \left[\left(\frac{y_2^d}{10^5}\right)^{\frac{\gamma-1}{\gamma}} - 1\right]}{k_1} \quad [7]$$

$$u_{valve} = \frac{-\dot{y}_2^d + k_4 k_5 y_1^d y_2^d - k_4 q_{O_2} + k_4 q_{H_2O}}{k_4 k_6 y_2^d} \quad [8]$$

In these two relations, the terms $y_n^d$ represent the desired trajectory of the variable. The application of the control to the dynamic system of equations [6], by using new control variables W1 and W2 in replacement for $d(y_1^d)/dt$, $d(y_2^d)/dt$ makes it possible to have a linear system with an integrator behavior (with W1=$d(y_1^d)/dt$ and W2=$d(y_2^d)/dt$).

The new controls W1 and W2 are the Brunovizky inputs of the system defined as:

$$W1 = \sigma(y_1^d - \omega)$$

$$W2 = \psi(y_2^d - pcath) \quad [9]$$

With σ and ψ being gain values configured to ensure stability and performance (gains with negative values). The reference trajectories of the outputs ($y_1^d$ and $y_2^d$) are chosen as a function of the desired behavior of the state variables pcath (desired stable and continuous behavior) and ω (having to be chosen in real time so that the flowrate of the compressor ensures a constant oxygen stoichiometry with the desired value).

Such a control law for the system FC 3 makes it possible to control the nonlinear dynamic variables of the air circuit so as to optimize its operation. From the point of view of the energy optimization of the operation of the vehicle, the system [9] provides a simplification of the modeling of the dynamics of the system which makes it possible to obtain an analytical solution to the optimization laws.

The problematic issue of the optimization of the consumption of fuel by the FC 3 amounts to determine a sequence of controls Pfc*, generated by the optimization function 521, making it possible to obtain a minimum of a cost function J(Pfc), while complying with the constraints and boundary conditions of the system. The minimization criterion can therefore be expressed as follows:

$$J(Pfc^*) = \min_{Pfc^*} \int_0^T g(Pfc(t)) \cdot dt \quad [10]$$

$$Pfc^* = \mathrm{argmin}(J(Pfc(t)))$$

On the basis of previously expressed relations, the dynamics of the system associating the electrical energy storage system 2 and the FC 3 is defined by the following system of equations:

$$d\epsilon/dt = -Pbatt$$

$$d\omega/dt = W1$$

$$dpcath/dt = W2 \quad [11]$$

In the logical part 5, the consumption of hydrogen of the FC 3 is modeled by a polynomial function g of degree 2, which is a function of the power Pfc:

$$g(Pfc(t)) = a*Pfc^2 + b*Pfc + c \quad [12]$$

The function can in particular provide the consumption of hydrogen in g/s by a quadratic approximation of the power delivered by the FC 3 during tests. This function g advantageously takes into account that the FC 3 consumes hydrogen even without providing electrical power. This is justified by the fact that this function g represents an equivalent hydrogen consumption model. This consumption model takes into account the consumption of the auxiliary components of the FC 3 even when the latter does not deliver any electrical power.

The parameters a, b and c are constant and related to the dimensioning of the system FC 3. These parameters can be computed on the basis of the response of the real system FC 3 subject to an electrical power demand profile, by the application of a parametric identification procedure such as the least squares procedure.

For an FC 3 of 30 kW, an exemplary value of the parameters may be:

a=4.9 10$^5$; b=4.83; c=4360

This modeling function may be obtained on the basis of the approximation of the consumption response of the complete model, starting from the assumption that the system FC 3 operates with controlled operating conditions (pressures at the anode and at the cathode, oxygen stoichiometry, temperature, humidity, etc.). This approximation allows the optimization problem to be solved explicitly (entirely suited to embedded applications exhibiting limited computational capacities), simplifying the control law.

As a function of the setpoint Ccc and of the speed of the vehicle SPDveh, the estimation function 523 estimates the electrical power Pbus* to be provided to the electrical load 4. For this purpose, the function 523 implements an inversion of the model of the vehicle traction chain.

In the optimization function 521, the power value Pbus* is like a variable of the optimization problem but above all like a parameter which varies over time.

In order to solve the optimization problem with a single control (Pbatt*), a change of variables is made in the cost function J(Pfc), by replacing the variable Pfc with its expression as a function of Pbatt and of the estimation of the power demanded by the vehicle. The following relation is thus obtained on the basis of the modeling function:

$$J(Pbatt^*) = \min_{Pbatt} \int_0^T (\alpha * Pbatt(t)^2 + \beta * Pbatt(t) + \gamma) \cdot dt \quad [13]$$

With β=−(2a (Pbus*(t)+b) and γ=(a (Pbus*(t))$^2$+b (Pbus (t))+c) the consumption function may be modeled as follows:

$$g(Pbatt) = \alpha * Pbatt(t)^2 + \beta * Pbatt(t) + \gamma \quad [14]$$

The constraints applied in the function 521 are the operating limitations of each component, while the boundary conditions are the conditions of the state variables of the system at the end of the running cycle. For example, the state of energy of the battery d'2 at the end of the running cycle must be equal to its reference value. In an integral hybrid operating mode (the FC 3 and the battery 2 are used over the whole of the running range), the state of energy at the end of the running cycle must be equal to the state of energy at the start of the running cycle.

The following parameters will be used in the relations:

(0 . . . T): the time interval of the running cycle;

SoE(t): the instantaneous state of energy of the battery 2;

Pcath: the pressure at the cathode of the cells of the FC 3;

StO2: dioxygen stoichiometry

The constraints taken into account are for example:
Pbatt$_{min}$≤Pbatt≤Pbatt$_{max}$
Pfc$_{min}$≤Pfc≤Pfc$_{max}$
SoE$_{min}$ (for example 40%)≤SoE≤SoE$_{max}$ (for example 80%)

The boundary conditions are for example:
SoE(T)=SoEref
Pcath(0 . . . T)=1.2 bar
StO2(0 . . . T)=1.5

The optimization function 521 can implement the Pontryaguine maximum principle (described by M Scordia in the document 'Approche systématique de l'optimisation du dimensionnement et de l'élaboration des lois de gestion d'énergie de véhicules hybrides' [Systematic approach to the optimization of the dimensioning and the formulation of hybrid vehicle energy management laws] PhD thesis, Université Henry Poincaré—Nancy 1, 2004). The optimization problem can be written in a more compact and symmetric form with the following Hamilton function:

$$H(\epsilon,\omega,p_{cath},P_{batt},W_1,W_2,\lambda_1,\lambda_2,\lambda_3)=g(P_{batt})+ \lambda_1 f_1(P_{batt})+\lambda_2 f_2(W_1)+\lambda_3 f_3(W_2)=g(P_{batt})-\lambda_1 P_{batt}+ \lambda_2 W_1+\lambda_3 W_2 \quad [15]$$

With $\lambda_1, \lambda_2, \lambda_3$ the co-states. The conditions on the states, the co-states and the controls for solving the optimization problems are:

$$\begin{cases} \dot{\epsilon}=\frac{\partial H}{\partial \lambda_1}; \dot{\omega}=\frac{\partial H}{\partial \lambda_2}; \dot{p}_{cath}=\frac{\partial H}{\partial \lambda_3} \\ -\dot{\lambda}_1=\frac{\partial H}{\partial \epsilon}; -\dot{\lambda}_2\frac{\partial h}{\partial \omega}; -\dot{\lambda}_3=\frac{\partial H}{\partial p_{cath}} \\ \frac{\partial H}{\partial P_{batt}}=0; \frac{\partial H}{\partial W_1}=0; \frac{\partial H}{\partial W_2}=0 \end{cases} \quad [16]$$

These conditions make it possible to find the optimal trajectories of the controls and co-states. By virtue of the flat nonlinear control applied to the dynamics of the FC system 3 in the controller 31, it is possible to minimize the Hamilton function in an explicit manner. The conditions on the derivatives of the co-states λn show that they are constant (dλn/dt=0), whereas the conditions on the derivatives of the Hamiltonian with respect to the controls are as follows:

$$\frac{\partial H}{\partial P_{batt}}=0=2aP^*_{batt}(t)+\beta(t)-\lambda_1 \Rightarrow \quad [17]$$

$$\Rightarrow P^*_{batt}(t)=\frac{\lambda_1-\beta(t)}{2a}$$

$$\frac{\partial H}{\partial W_1}=0=\lambda_2$$

$$\frac{\partial H}{\partial W_2}=0=\lambda_3$$

These conditions show that the optimization problem depends only on the co-state λ1 and on the parameters of the system. This signifies that the control law implemented in the controller 31 for the air circuit of the FC 3 is sufficient to ensure a dynamic response of the power Pfc (according to the power setpoint Pfc* given by the optimization function 521) and makes it possible to eliminate the dynamic terms of the FC 3 of the optimization problem in the optimization function 521.

In equations [17], the control Pbatt* depends on the co-state λ1 (constant during the running cycle). λ1 is representative of the power ratio between the battery 2 and the FC 3. In order to find the solution for this optimization problem, the control Pbatt is implemented by choosing λ1 such that the constraints and the boundary condition (SoE (T)=SoEref) are achieved. The output of the optimization function 521 is the power setpoint Pfc* that the FC 3 must provide. The following relation makes it possible to compute the setpoint Pfc* and must be embedded in the logical part 521.

$$Pfc^*=(\lambda 1-b)/(2a) \quad [18]$$

Figure 3:
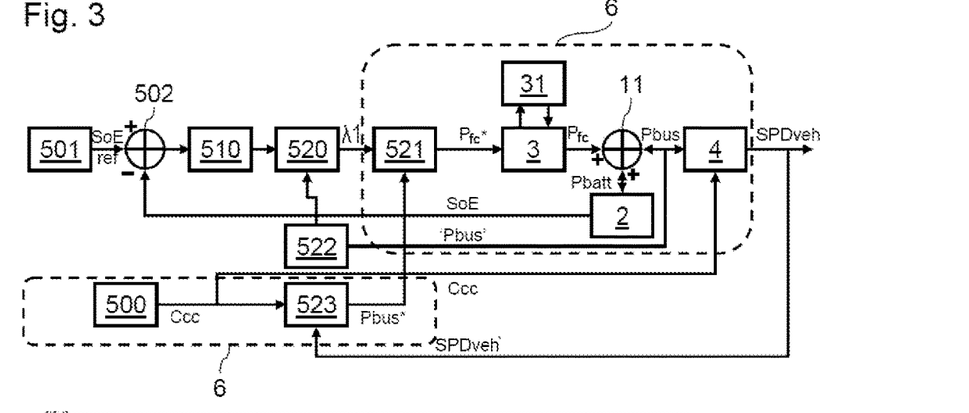
FIG. 3 emphasizes the elements of FIG. 1 exhibiting fast dynamics.

The optimization function 521 computes the setpoint Pfc* with a frequency similar to the dynamics of the vehicle (frequency lying between 2 and 100 Hz). This computation frequency constraint highlights the necessity to employ as proposed a simplified computation of the setpoint power. Relation [18] is algebraic and can be solved by direct computations, without needing to implement iterative minimum search algorithms. FIG. 3 repeats the schematic representation of the vehicle while emphasizing in the zone 6 the elements having fast dynamics.

Even if there is an algebraic formulation of Pfc* in this block, the computation of the parameter λ1 may represent a drawback for an on-line embedded application. Indeed, the computation of λ1 must not culminate in a degradation of the optimization through ignorance of the running cycle or require repeated off-line optimizations.

The forecasts correction function 520 implements the computation of the parameter λ1 as follows. When the complete driving cycle is unknown a priori, in order to optimize consumption, the function 520 provides a value λ1 suited to the running conditions in progress. The function 520 is aimed at computing λ1 by using a finite prediction horizon for the running cycle. The function 520 computes λ1 so that the state of energy at the end of the prediction horizon is equal to the value SoEref (boundary condition of the optimization problem). The mathematical formulation of the value λ1 is based on relation [18] and formulated as follows:

$$P\text{batt}^*(t)=(\lambda 1-\beta(t))/(2a) \text{ from which is deduced}$$
$$\lambda 1=\beta(t)+2a^*P\text{batt}^*(t) \quad [19]$$

The proposed approach uses a finite prediction horizon where the value λ1 is constant for solving the optimization problem. For a finite horizon of a duration Th with a computation time-step Δt, the same value of λ1 will be computed a number Th/Δt of times by the following relation:

$$\lambda_1=\frac{\left(\sum_{j=t}^{t+T_h}(P_{batt}(j))\cdot 2a\right)+\sum_{j=t}^{t+T_h}\beta(j)}{\left(\frac{T_h}{\Delta t}\right)} \quad [20]$$

Replacing β(j) by β(j)=−(2a*Pbus(j)+b), the following relation is obtained:

$$\lambda_1=\frac{2a\left(\left(\sum_{j=t}^{t+T_h}(P_{batt}(j))\right)-\sum_{j=t}^{t+T_h}P_{bus}(j)\right)}{\left(\frac{T_h}{\Delta t}\right)}+b \quad [21]$$

In this formulation, λ1 possesses a constant part given by the parameter b, which can be used as default value of lambda in the degraded case mentioned subsequently. The objective of the value of λ1 computed by equation [21] is to restore the value of state of energy SoE of the battery 2 to its reference value SoEref at the end of the horizon Th. Consequently, a change of variable is made so that the variable SoE is integrated into the computation of λ1. As the value SoE is the integral of the power of the battery 2 over time, the following relation is obtained:

$$\lambda_1 = \frac{2a\left(\frac{\Delta SoE_{desire'} \cdot \varepsilon_{max}}{\Delta t} - \sum_{j=t}^{t+T_h} P_{bus}(j)\right)}{\left(\frac{T_h}{\Delta t}\right)} + b \quad [22]$$

The value ΔSoE is an input of the function 520 and represents the difference between SoEref and SoE, determined by the comparator 502 (and expressed as a percentage). This dependency characteristic of the ΔSoE makes it possible to control the excursions of SoE through the change of λ1 on the optimization of the function 521.

The computation of λ1 involves the power 'Pbus' sampled at each time-step Δt in a prediction horizon Th. The function 522 provides the power distribution Pbus, based on data acquired in the past, to the function 520.

A proposed approach is based on the assumption that the behavior over a past time horizon will be reproduced in the future horizon. This assumption makes it possible to obtain results which ensure the operating constraints and allow the energy management system to profit from recovery while braking in an optimum manner so as to increase the efficiency of the vehicle. In obtaining this power distribution, it is necessary for the logical part 5 to have a memory to store the power values 'Pbus'.

Consequently the computed co-state λ1 interacts with the optimization in such a way as to restore the SoE to its level SoEref without degrading the optimization. Two important parameters for the computation of λ1 are the prediction horizon Th and the periodicity of the computation Δt. The choice of the prediction horizon can be made over a time span of a few tens of seconds to a few minutes. A shorter horizon favors a running profile with frequent changes of power level (accelerations), while a longer horizon is better for a running profile with a more constant power. An appropriate duration of prediction horizon makes it possible to anticipate possible recoveries of energy on braking.

Figure 4:
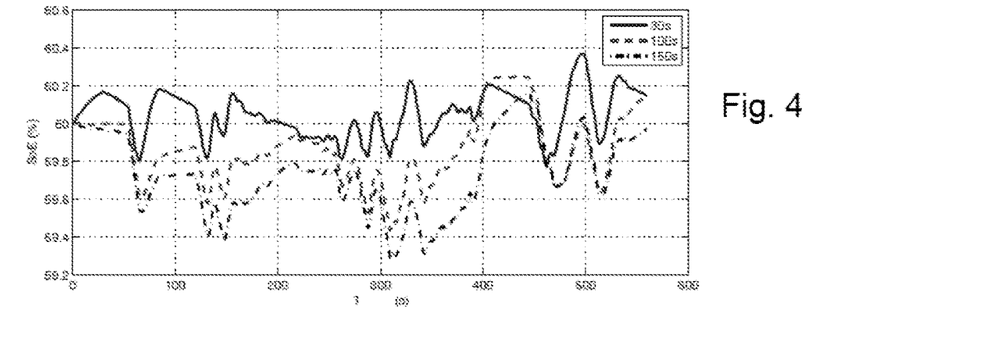
FIGS. 4 to 6 are charts of the energy states for various running profiles, with various durations of prediction horizon.
Figure 5:
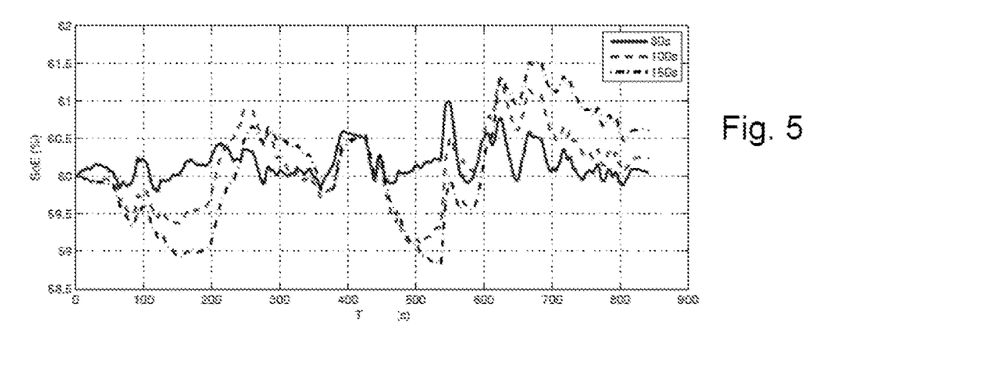
Figure 6:
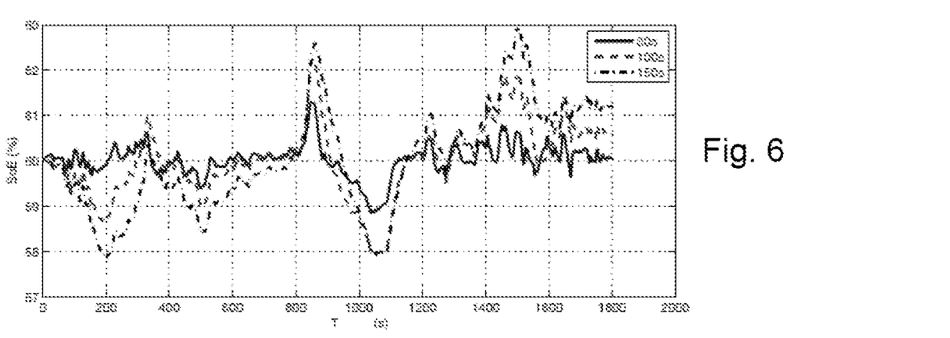

FIGS. 4 to 6 illustrate energy state simulations, respectively in urban, road and highway cycles, for various values of prediction horizon. These figures clearly illustrate the sensitivity of the state of charge over time as a function of the duration of the prediction horizon.

By analyzing the driving cycle, the logical part can advantageously carry out the computation of λ1 with a prediction over a time window adapted in a dynamic manner to the driving style determined.

The computation of λ1 can be carried out at a frequency lower than or equal to the frequency of computation of Pfc* by the optimization function 521. λ1 exhibits a computation dynamics lower than or equal to the computation dynamics of Pfc*.

Each iteration of computation of λ1 is carried out on the basis of a value of ΔSoE and of a new prediction of the value Pbus.

The operation of the function 501 for defining the reference value SoEref may be as follows.

The value of SoEref may be determined by the use of a fixed value in the simplest case.

The value of SoEref can also be determined by an off-line optimization. The off-line optimization can in particular be carried out using a geolocation system. The geolocation system can determine a road profile that the user desires to follow. The geolocation system can determine the probable speed of the vehicle for this road profile.

The computer 5 can determine an optimal speed profile for this road profile, on the basis of the road profile and the corresponding driving constraints. On the basis of this optimal speed profile and of the capacity for inversion of the modeling of the traction chain, the computer 5 can determine the electrical power profile corresponding to the optimal speed profile. Such a procedure is in particular detailed in the document 'Vehicle trajectory optimization for application in ecodriving' published within the framework of the conference 'Vehicle Power and Propulsion Conference (VPPC)' IEEE 2011, pp. 1-6, by M M Mensing, Trigui and Bideaux.

This power profile may arise from another off-line optimization, using for example the dynamic programming procedure. This procedure makes it possible to identify the global optimum of the consumption on the basis of the optimal distribution of the power between the FC 3 and the battery 2. This procedure also provides an optimized profile of the values SoE making it possible to determine the value SoEref.

With an optimized profile of SoE for determining SoEref, the computation of λ makes it possible to correct the response of the optimization on-line when the system is subject to disturbances.

The value SoEref can also be modified as a function of the altitude of the vehicle. The potential energy of the vehicle changes as a function of altitude:

when climbing, the vehicle consumes additional energy but increases its potential energy;

when descending, the potential energy of the vehicle can be at least partially recovered by regeneration while braking.

The altitude of the vehicle can be determined either by an altitude measurement apparatus (altimeter) or on the basis of the position provided by the vehicle geolocation device. The following relation provides an example of determining the function of the value of SoEref as a function of altitude.

$SoEref(t) = SoE_{h=0} - [(SoE_{h=0} - SoE_{min})*h(t)/hmax]$ where $SoE_{h=0}$ is the value of SoEref at the reference altitude, h(t) is the altitude at the instant t, and hmax is the defined maximum altitude. For h(t)=hmax, the value of SoEref will equal the minimum value $SoE_{min}$.

Simulations have shown that by taking the altitude into account when determining the value SoEref it is possible to optimize the recovery on braking since the SoE attains its maximum value of 80% during the descent. Taking the battery into account permits the battery to discharge further during the climb so as to allow greater recharging on the descent.

The value SoEref can also be modified as a function of the speed of the vehicle, to take account of its kinetic energy.

In order to improve the robustness of the control method, a robustness function 510 is advantageously interposed between the comparator 502 and the forecasts correction function 520. The robustness function 510 can carry out for example a correction of PI (proportional-integrator) type on the signal ΔSoE, or carry out a control of Hinfinity type on the basis of the signal ΔSoE. On account of the slow dynamics of the state of energy of the battery 2, the frequency of sampling the functions 501 and 510 may be lower than or equal to the frequency of computation of λ1.

The equation modeling the consumption of the FC 3 as a function of the electrical power Pfc is here a polynomial of degree 2. It is also possible to envisage a consumption model based on any other type of algebraically solvable function.

The invention claimed is:
1. An automotive vehicle drive unit, comprising:
   a fuel cell comprising a flat non-linear control whose control input Pfc* is a setpoint of the electrical power to be delivered by the fuel cell;
   a reversible electrical energy storage system;
   an electric motor configured to propel the wheels of a vehicle;
   an electrical connection element configured to selectively connect the fuel cell and/or the energy storage system to the electric motor;
   a control circuit:
      storing a model of the consumption of dihydrogen of the fuel cell as a function of the electrical power delivered by this fuel cell, in the form of a second-degree polynomial g(Pfc*)=a*Pfc*² +b*Pfc*+c, with a, b and c being constants;
      configured to compute a coefficient of power distribution λ1 between the fuel cell and the electrical energy storage system

$$\lambda_1 = \frac{2a\left(\frac{\Delta SoE \cdot \varepsilon_{max}}{\Delta t} - \sum_{j=t}^{t+T_h} P_{bus}(j)\right)}{\left(\frac{T_h}{\Delta t}\right)} + b$$

with ΔSoE the difference between a target quantity of energy in the storage system and the current quantity of energy of the storage system expressed as a percentage, Pbus(j) are measurement values of electrical power exchanged between the electric motor and the electrical connection element, Δt is a time interval separating two successive measurements of Pbus(j), Th is the electric motor's duration of operation taken into account for the computation of λ1, $\varepsilon_{max}$ is the maximum quantity of energy that can be stored in the electrical energy storage system;
      configured to apply the power setpoint Pfc* to the flat non-linear control of the fuel cell, with Pfc*=(λ1−b)/(2a);
      configured to control the electrical connection element so as to recharge the electrical energy storage system when the value of the power setpoint Pfc* is greater than the power demanded by the electric motor.

2. The automotive vehicle drive unit as claimed in claim 1, in which the control circuit is configured to determine an amplitude of variation between values Pbus(j) and configured to lower the value of Th upon an increase in the amplitude of variation and configured to increase the value of Th upon a decrease in the amplitude of variation.

3. The automotive vehicle drive unit as claimed in claim 1, in which said duration Th lies between 20 and 600 seconds.

4. The automotive vehicle drive unit as claimed in claim 1, in which said interval Δt lies between 1 second and 20 seconds.

5. The automotive vehicle drive unit as claimed in claim 1, in which the ratio Th/Δt is at least equal to 5.

6. The automotive vehicle drive unit as claimed in claim 1, in which the control circuit is configured to compute the value ΔSoE with a lower frequency than the frequency of the power measurements Pbus(j).

7. The automotive vehicle drive unit as claimed in claim 1, in which the target quantity of energy lies between 40 and 80% of the maximum quantity of energy of the electrical energy storage system.

8. The automotive vehicle drive unit as claimed in claim 1, in which the electrical energy storage system includes an electrochemical accumulator battery.

9. The automotive vehicle drive unit as claimed in claim 1, in which the fuel cell comprises:
   a reactor;
   a pump, said pump being configured to compress air at the cathode of the reactor, said pump including an electric motor and a compression rotor rotated by the electric motor of the pump;
   a valve for regulating the air flowrate through the reactor;
   the flat nonlinear control of the fuel cell being configured to convert the power setpoint Pfc* respectively into a setpoint voltage of the electric motor of the pump and into a setpoint voltage of the valve.

* * * * *